United States Patent
Ko et al.

(10) Patent No.: US 8,457,245 B2
(45) Date of Patent: Jun. 4, 2013

(54) METHOD OF TRANSMITTING PRECODING INFORMATION IN MULTIPLE ANTENNA SYSTEM

(75) Inventors: Hyun Soo Ko, Seoul (KR); Wook Bong Lee, Seoul (KR); Jae Hoon Chung, Seoul (KR); Bin Chul Ihm, Seoul (KR); Moon Il Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 12/864,656

(22) PCT Filed: Jan. 29, 2009

(86) PCT No.: PCT/KR2009/000425
§ 371 (c)(1),
(2), (4) Date: Jul. 26, 2010

(87) PCT Pub. No.: WO2009/096708
PCT Pub. Date: Aug. 6, 2009

(65) Prior Publication Data
US 2010/0310000 A1    Dec. 9, 2010

Related U.S. Application Data

(60) Provisional application No. 61/024,896, filed on Jan. 30, 2008.

(30) Foreign Application Priority Data

May 27, 2008  (KR) .................. 10-2008-0049283

(51) Int. Cl.
*H04L 27/00* (2006.01)

(52) U.S. Cl.
USPC .......................... 375/295; 375/260

(58) Field of Classification Search
None
See application file for complete search history.

(56) References Cited

U.S. PATENT DOCUMENTS

| | | | |
|---|---|---|---|
| 2004/0013180 A1 | 1/2004 | Giannakis et al. | |
| 2008/0268862 A1* | 10/2008 | Kent et al. | 455/452.2 |
| 2011/0194646 A1* | 8/2011 | Khojastepour | 375/295 |

FOREIGN PATENT DOCUMENTS

| | | |
|---|---|---|
| KR | 10-2001-0076252 | 8/2001 |
| KR | 10-2003-0007481 | 1/2003 |

* cited by examiner

*Primary Examiner* — Leon-Viet Nguyen
(74) *Attorney, Agent, or Firm* — Lee, Hong, Degerman, Kang & Waimey

(57) ABSTRACT

A method of transmitting precoding information in a multiple antenna system includes selecting M subbands from a plurality of subbands constituting a whole frequency band in a descending order of a channel quality indicator (CQI), where M is an integer satisfying M>0, and transmitting a first precoding matrix indicator (PMI) for the M subbands and a second PMI for a remaining band, wherein the first PMI is a PMI of a codebook selected from a first codebook set including a plurality of codebooks and the second PMI is a PMI of a codebook selected from a second codebook set including a part of the plurality of codebooks of the first codebook set. Accordingly, precoding information can be effectively transmitted by separately preparing a codebook for a best band and a codebook for a non-selected band.

8 Claims, 3 Drawing Sheets

METHOD OF TRANSMITTING PRECODING INFORMATION IN MULTIPLE ANTENNA SYSTEM

CROSS-REFERENCE TO RELATED APPLICATIONS

This application is the National Stage filing under 35 U.S.C. §371 of International Application No. PCT/KR2009/000425, filed on Jan. 29, 2009, which claims the benefit of earlier filing date and right of priority to Korean Application No. 10-2008-0049283, filed on May 27, 2008, and also claims the benefit of U.S. Provisional Application Ser. No. 61/024,896, filed on Jan. 30, 2008.

TECHNICAL FIELD

The present invention relates to wireless communications, and more particularly, to a method for more effectively transmitting precoding information in a multiple antenna system.

BACKGROUND ART

Wireless communication systems are widely used to provide various types of communications. For example, voice and/or data are provided by the wireless communication systems. A conventional wireless communication system provides multiple users with one or more shared resources. For example, the wireless communication system can use various multiple access schemes such as code division multiple access (CDMA), time division multiple access (TDMA), and frequency division multiple access (FDMA).

An orthogonal frequency division multiplexing (OFDM) scheme uses a plurality of orthogonal subcarriers. Further, the OFDM scheme uses an orthogonality between inverse fast Fourier transform (IFFT) and fast Fourier transform (FFT). A transmitter transmits data by performing IFFT. A receiver restores original data by performing FFT on a received signal. The transmitter uses IFFT to combine the plurality of subcarriers, and the receiver uses FFT to split the plurality of subcarriers. According to the OFDM scheme, complexity of the receiver can be reduced in a frequency selective fading environment of a broadband channel, and spectral efficiency can be improved through selective scheduling in a frequency domain by utilizing channel characteristics which are different from one subcarrier to another. An orthogonal frequency division multiple access (OFDMA) scheme is an OFDM-based multiple access scheme. According to the OFDMA scheme, a radio resource can be more efficiently used by allocating different subcarriers to multiple users.

Recently, to maximize performance and communication capability of a wireless communication system, a multiple input multiple output (MIMO) system has drawn attention. Being evolved from the conventional technique in which a single transmit (Tx) antenna and a single receive (Rx) antenna are used, a MIMO technique uses multiple Tx antennas and multiple Rx antennas to improve transfer efficiency of data to be transmitted or received. The MIMO system is also referred to as a multiple antenna system. In the MIMO technique, instead of receiving one whole message through a single antenna path, data segments are received through a plurality of antennas and are then collected as one piece of data. As a result, a data transfer rate can be improved in a specific range, or a system range can be increased with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt and the number of Rx antennas is Nr, then the number of independent channels is Ni where $Ni \leq \min\{Nt, Mr\}$. Each independent channel can be referred to as a spatial layer. A rank represents the number of non-zero eigen-values of the MIMO channel and can be defined as the number of spatial streams that can be multiplexed. The spatial multiplexing is a technique in which the multiple Tx antennas simultaneously transmit different data so that the data can be transmitted at a high speed without increasing a system bandwidth.

The beamforming is used to add a weight factor to multiple antennas according to a channel condition so as to increase a signal to interference plus noise ratio (SINR) of a signal. The weight factor can be expressed by a weight vector. Two or more weight vectors can be expressed by a weight matrix. The weight vector is referred to as a precoding vector. The weight matrix is referred to as a precoding matrix. Channel dependent precoding is a precoding method using a weight factor depending on the channel condition. The channel dependent precoding uses a weight factor suitable for the channel condition in order to maximize capacity of a transport channel. Channel information for the channel dependent precoding can be obtained using a sounding channel, a codebook, channel quantization, etc. A system using codebook-based precoding among a variety of precoding methods creates a codebook set that can reflect the channel condition, and selects a codebook that maximizes a reception capacity of the transport channel. In general, the reception capacity of the transport channel can increase in proportion to the number of codebooks of the codebook set.

When the OFDM system applies the channel dependent precoding, optimal performance can be obtained using a weight factor for each subcarrier. However, the use of the weight factor for each subcarrier may result in a significantly large overhead caused by signaling. The overhead caused by control signaling when the weight factor for each subband is used by dividing a whole frequency band into a subband which is a group of consecutive subcarriers. A user equipment (UE) reports to a base station (BS) a preferred codebook and a channel condition for each subband, and the BS performs scheduling by considering the reported information. In general, the BS improves system performance by assigning a subband having a good channel condition to the UE. That is, the subband having a good channel condition has a higher possibility of being assigned than a subband having a poor channel condition. An unnecessary overhead may occur when the UE transmits a channel condition and a codebook not only for the subband having a high possibility of being assigned but also for all subbands having a low possibility of being assigned.

Accordingly, there is a need for a method capable of reducing a transfer amount of control information while ensuring scheduling efficiency in a multiple antenna system.

DISCLOSURE OF INVENTION

Technical Problem

The present invention provides a method capable of reducing a transfer amount of control information while ensuring scheduling efficiency in a multiple antenna system.

Technical Solution

In an aspect, a method of transmitting precoding information in a multiple antenna system includes selecting M subbands from a plurality of subbands constituting a whole frequency band in a descending order of a channel quality indicator (CQI), where M is an integer satisfying M>0, and transmitting a first precoding matrix indicator (PMI) for the M subbands and a second PMI for a remaining band, wherein the first PMI is a PMI of a codebook selected from a first codebook set including a plurality of codebooks and the second PMI is a PMI of a codebook selected from a second codebook set including a part of the plurality of codebooks of the first codebook set.

In another aspect, a method of transmitting control information in a multiple antenna system includes transmitting downlink control information indicating a reporting scheme of feedback data, and receiving the feedback data in response to the downlink control information, wherein the downlink control information includes a first codebook set for a primary subband selected to report a CQI and a PMI and a second codebook set for a secondary subband prepared to report the CQI and the PMI, and the second codebook set is selected from the first codebook set.

Advantageous Effects

According to the present invention, precoding information can be effectively transmitted by separately preparing a codebook for a best band and a codebook for a non-selected band.

MODE FOR THE INVENTION

Figure 1:
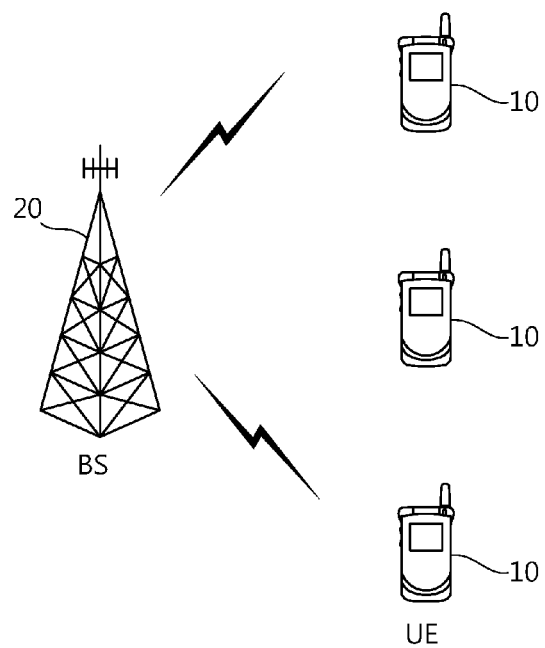
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

A downlink (DL) represents a communication link from the BS 20 to the UE 10, and an uplink (UL) represents a communication link from the UE 10 to the BS 20. In the DL, a transmitter may be a part of the BS 20, and a receiver may be a part of the UE 10. In the UL, the transmitter may be a part of the UE 10, and the receiver may be a part of the BS 20.

The wireless communication system may be an orthogonal frequency division multiplexing (OFDM)/orthogonal frequency division multiple access (OFDMA)-based system. The OFDM uses a plurality of orthogonal subcarriers. Further, the OFDM uses an orthogonality between inverse fast Fourier transform (IFFT) and fast Fourier transform (FFT). The transmitter transmits data by performing IFFT. The receiver restores original data by performing FFT on a received signal. The transmitter uses IFFT to combine the plurality of subcarriers, and the receiver uses FFT to split the plurality of subcarriers.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

The multiple antenna system can use a scheme using multiple antennas. In case of a rank 1, the scheme may be space-time coding (STC) (e.g., space frequency block code (SFBC) and space time block code (STBC)), cyclic delay diversity (CDD), frequency switched transmit diversity (FSTD), time switched transmit diversity (TSTD), etc. In case of a rank 2 or higher ranks, the scheme may be spatial multiplexing (SM), generalized cyclic delay diversity (GCDD), selective virtual antenna permutation (S-VAP), etc. The SFBC is a scheme for effectively applying selectivity in a space domain and a frequency domain to ensure both a diversity gain and a multi-user scheduling gain in a corresponding dimension. The STBC is a scheme for applying selectivity in the space domain and a time domain. The FSTD is a scheme in which signals transmitted to multiple antennas are divided in the time domain, and the TSTD is a scheme in which the signals transmitted to the multiple antennas are divided in the frequency domain. The SM is a scheme for transmitting different data to each antenna to improve a transfer rate. The GCDD is a scheme for applying selectivity in the time domain and the frequency domain. The S-VAP is a scheme using a single precoding matrix, and includes a multi-codeword (MCW) S-VAP for mixing multi-codewords to antennas in spatial diversity or spatial multiplexing and a single codeword (SCW) S-VAP using a single codeword.

Figure 2:
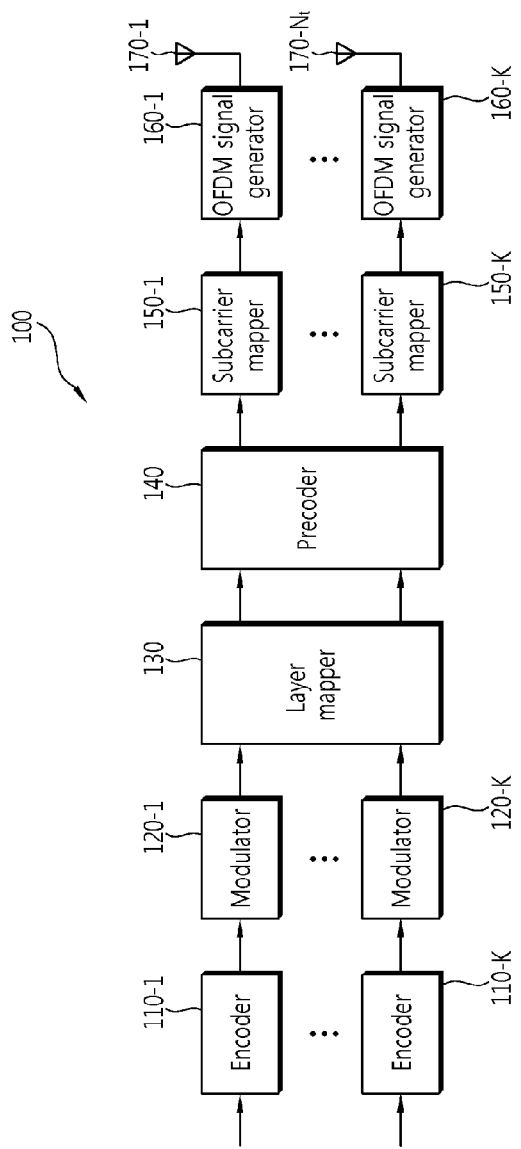
FIG. 2 is a block diagram showing a structure of a transmitter according to an embodiment of the present invention.

FIG. 2 is a block diagram showing a structure of a transmitter according to an embodiment of the present invention.

Referring to FIG. 2, a transmitter 100 includes encoders 110-1, . . . , 110-K, modulators 120-1, . . . , 120-K, a layer mapper 130, a precoder 140, subcarrier mappers 150-1, . . . , 150-K, and OFDM signal generators 160-1, . . . , 160-K. The transmitter 100 also includes Nt (Nt>1) Tx antennas 170-1, . . . , 170-Nt.

The encoders 110-1, . . . , 110-K generate coded data by encoding input data according to a predetermined coding scheme. The modulators 120-1, . . . , 120-K arrange the coded data into symbols representing locations on a signal constellation. A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM.

The layer mapper 130 defines a layer of an input symbol so that each antenna can distribute a specific symbol to a path of each antenna. The layer is defined as an information path input to the precoder 140. The information path located ahead of the precoder 140 can be called a virtual antenna (or layer).

The precoder 140 processes an input symbol by using a MIMO scheme according to the multiple Tx antennas 170-1, . . . , 170-Nt. For example, the precoder 140 can use codebook-based precoding. The precoder 140 can use a codebook selected from a primary codebook set which is a group of predetermined codebooks and a codebook selected from a secondary codebook set which includes a less number of codebooks than the primary codebook set. The precoder 140 distributes an antenna-specific symbol to the subcarrier mappers 150-1, . . . , 150-K for a path of a specific antenna. Each information path transmitted to one antenna by the precoder 140 by the use of one subcarrier mapper is called a stream. The antenna may be a physical antenna.

The subcarrier mappers 150-1, . . . , 150-K allocate input symbols to suitable subcarriers and then multiplex the resultant symbols according to a user. The OFDM signal generators 160-1, . . . , 160-K modulate input symbols according to an OFDM scheme and then outputs OFDM symbols. The OFDM signal generators 160-1, . . . , 160-K can perform inverse fast Fourier transform (IFFT) on input symbols. A cyclic prefix (CP) may be inserted into a time-domain symbol which has undergone the IFFT. The OFDM symbols are transmitted through the respective Tx antennas 170-1, . . . , 170-Nt.

In the MIMO system, the transmitter 100 can operate in two modes. One is an SCW mode and the other is an MCW mode. In the SCW mode, Tx signals transmitted through a MIMO channel have the same data rate. In the MCW mode, data transmitted through the MIMO channel is independently encoded, and thus the Tx signals can have different data rates. The MCW mode operates when a rank is greater than 1.

Hereinafter, feedback data transmitted from a UE to a BS will be described. The feedback data may be transmitted periodically or may be transmitted at the request of the BS. The feedback data is uplink control information and is transmitted through an uplink control channel. Examples of the control information included in the feedback data include a channel quality indicator (CQI) indicating a channel condition, a precoding matrix indicator indicating a precoding matrix preferred by the UE, a rank indicator (RI) indicating a rank, etc.

Figure 3:
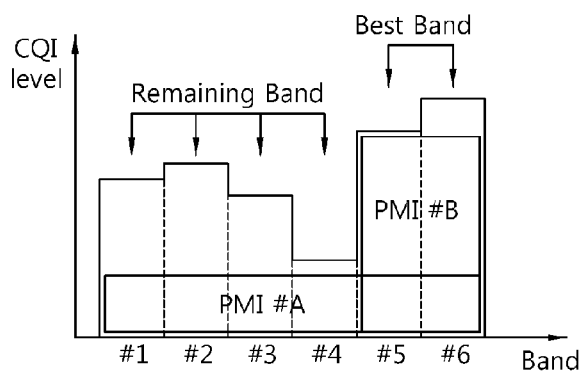
FIG. 3 shows feedback data according to an embodiment of the present invention.

FIG. 3 shows feedback data according to an embodiment of the present invention.

Referring to FIG. 3, a whole frequency band can be divided into a plurality of subbands. Radio resources for user data or a control signal are allocated on a frame which includes a plurality of OFDM symbols in a time domain and a plurality of subcarriers in a frequency domain. A plurality of subcarriers consecutive in the frequency domain is a resource block (RB) which is a basic unit of radio resource allocation. The RB may include 12 consecutive subcarriers in the frequency domain. A subband includes at least one RB. For example, one subband may be two consecutive RBs.

A UE can measure a channel condition for each subband, and can transmit a CQI according to a best-M scheme. The best-M scheme is a scheme for selecting M specific subbands from a plurality of subbands, where M is an integer satisfying M≧1. In CQI transmission based on the best-M scheme, M subbands are selected as a best band in a descending order of a CQI level (or a CQI value), and a CQI of the best band and an indicator indicating the best band are transmitted. A remaining band denotes subbands remaining after excluding the best band from a whole frequency band. A whole band denotes a whole frequency band including the best band. When the feedback data is transmitted according to the best-M scheme, the best band is referred to as a selected band, and the remaining band or the whole band is referred to as a non-selected band.

It is assumed herein that the whole frequency band includes 6 subbands, and a CQI and a PMI are transmitted as feedback data according to a best-M scheme (M=2) in which two subbands among the 6 subbands are selected as the best band. When a PMI band is defined as a frequency band at which the PMI is obtained, a granularity of the PMI band may be the same as or a multiple of a granularity of the subband. If the granularity of the PMI band is double of the granularity of the subband, one PMI can be used for two subbands selected as the best band. A PMI of the best band is referred to as PMI #B. Another PMI can be used for the whole band. A PMI of the whole band is referred to as PMI #A.

In a case where one precoding is used for the whole band in a system using channel dependent precoding, feedback data can be transmitted in such a format that the PMI of the whole band is added to a general CQI transmission scheme. A transfer rate of the best band can be increased by additionally using a codebook for the best band, thereby increasing system performance. The PMI #B used for the best band may be a PMI of a codebook selected from a first codebook set prepared in advance for the best band. The PMI #A used for the whole band may be a PMI of a codebook selected from a second codebook set additionally prepared for the whole band. The second codebook set may consist of some of codebooks selected from a plurality of codebooks included in the first codebook set.

The UE obtains a CQI by using the PMI #A or the PMI #B. The CQI can be obtained in various manners as follows.

1. A CQI for each of the subbands #5 and #6 belonging to the best band can be obtained by using the PMI #B of the best band.

2. An average CQI of the subbands #5 and #6 belonging to the best band can be obtained by using the PMI #B of the best band.

3. An average CQI of the whole band can be obtained by using the PMI #A of the whole band.

4. An average CQI of the remaining band can be obtained by using the PMI #A of the whole band.

5. An average CQI of a CQI for the remaining band using the PMI #A of the whole band and a CQI for the best band using the PMI #B of the best band can be obtained.

A method for transmitting only a CQI of each subband selected as the best band is referred to as a best-M CQI scheme. In the best-M CQI scheme, M CQIs and an indicator indicating the best band are transmitted. Since only a CQI for the best band is transmitted, an overhead caused by CQI transmission can be reduced, and data transfer efficiency can be increased by performing scheduling in consideration of the best band.

A method for transmitting only an average CQI of subbands selected as the best band is referred to as a best-M average CQI scheme. In the best-M average CQI scheme, one CQI and an indicator indicating the best band are transmitted, thereby further decreasing the overhead caused by CQI transmission.

When only the CQI for the best band is transmitted according to the best-M CQI scheme or the best-M average CQI scheme, radio resource scheduling can be performed on the non-selected remaining band. Scheduling efficiency may deteriorate when radio resource scheduling is performed on the remaining band for which the CQI is not reported. To avoid this problem, the average CQI of the remaining band or the whole band may be transmitted together with the CQI for the best band, which is referred to as a best-M CQI supplementary scheme. The BS preferentially performs radio resource scheduling by considering the best band of the UE, and if the best band cannot be assigned to the UE, the BS allocates radio resources to the remaining band. It can be said that the best band is a primary subband preferentially considered for radio resource scheduling, and the remaining band is a secondary subband secondarily considered for radio resource scheduling. Decrease in scheduling efficiency can be compensated for with respect to the non-selected band according to the best-M CQI supplementary scheme.

In the best-M CQI supplementary scheme, a CQI obtained for the best band (by using a CQI measuring method 1 or 2) and a CQI obtained for a subband which is not selected (by using a CQI measuring method 3, 4, or 5) are transmitted, and a PMI (PMI #B and PMI #A) used for CQI transmission is transmitted. For example, the average CQI of the best band and the PMI #B can be transmitted for the best band, and the average CQI of the whole band and the PMI #A can be transmitted for the non-selected band.

The BS can report information regarding the best-M CQI scheme, the best-M average CQI scheme, the best-M CQI supplementary scheme, etc., to be used by the UE through a downlink control channel. The downlink control channel may be a broadcast channel that can be received by all UEs or a dedicated control channel which can be received by a specific UE.

Figure 4:
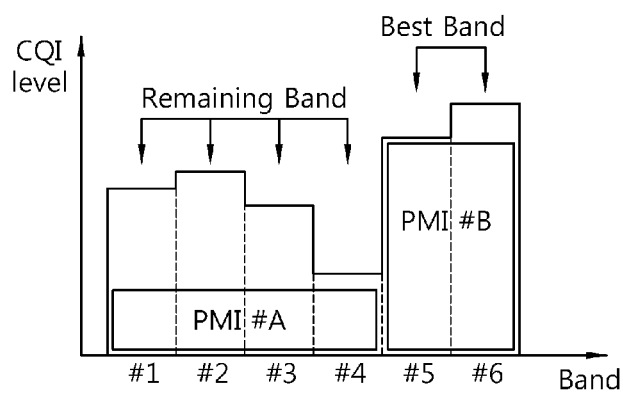
FIG. 4 shows feedback data according to another embodiment of the present invention.

FIG. 4 shows feedback data according to another embodiment of the present invention.

Comparing with FIG. 3, FIG. 4 shows a case where PMI #A belonging to a remaining band is used for a non-selected band.

In the best-M scheme, a CQI for a subband which is not selected can be obtained as follows.

1. An average CQI of the remaining band can be obtained by using the PMI #A of the remaining band.

2. An average CQI of a whole band can be obtained by using the PMI #A of the remaining band.

3. An average CQI of a CQI for the remaining band using the PMI #A of the remaining band and a CQI for the best band using the PMI #B for the best band can be obtained.

The PMI #B used for the best band may be a PMI of a codebook selected from a first codebook set prepared in advance for the best band. The PMI #A used for the remaining band may be a PMI of a codebook selected from a second codebook set additionally prepared for the remaining band.

In the best-M CQI supplementary scheme, the PMI #B and the average CQI of the best band can be transmitted for the best band, and the PMI #A and the average CQI of the remaining band can be transmitted for the non-selective band.

As such, in a system using channel dependent precoding, a CQI is obtained by using a PMI of the best band and the whole band/remaining band, and feedback data is transmitted by including the PMI and the CQI. The best band is preferentially considered when radio resource scheduling is performed. Thus, system performance can be determined according to the best band. As a result, system performance can be improved when a precoding granularity for the best band is set to a small value. In addition, system performance can be further improved by selecting precoding optimized for the whole band or the remaining band.

A codebook used in the best band has a small precoding granularity. However, if the codebook of the best band is directly used for precoding of the whole band or the remaining band which is relatively less utilized, it may cause an unnecessary control signaling overhead. The BS transmits a codebook to the UE so that the UE can use a preferred precoding matrix. The UE transmits an index (i.e., PMI) of the preferred precoding matrix to the BS. System performance can be improved by using a codebook set having a large number of codebooks. However, when the codebook set having the large number of codebooks is directly used for a non-selected band which is relatively less utilized, control signaling is increased to that extent.

Hereinafter, a method for improving system performance by additionally preparing a codebook set for a best band and a codebook set for a whole band or a remaining band will be described.

Figure 5:
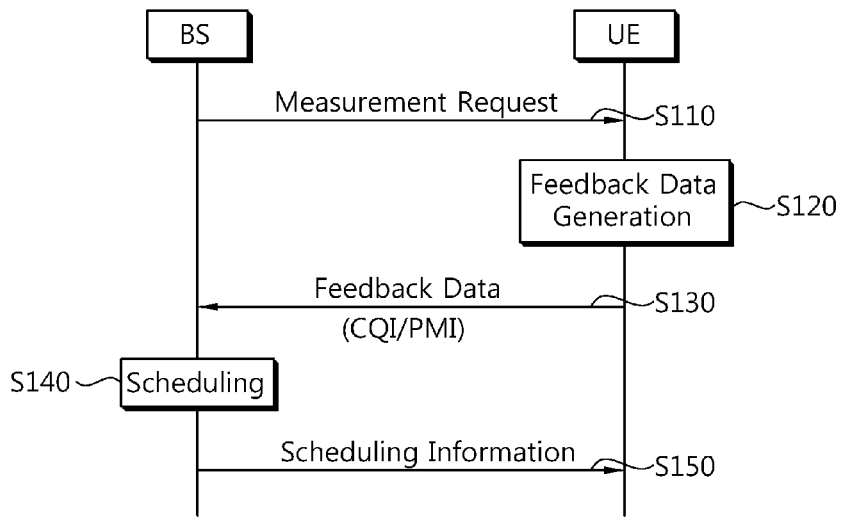
FIG. 5 is a flow diagram showing a method for transmitting control information according to an embodiment of the present invention.

FIG. 5 is a flow diagram showing a method for transmitting control information according to an embodiment of the present invention.

Referring to FIG. 5, a BS transmits a measurement request message to a UE (step S110). The measurement request message is a message for instructing the UE to measure and report a channel condition for radio resource scheduling. The measurement request message may include information regarding a period for reporting the channel condition or an uplink radio resource for reporting the channel condition. Further, the measurement request message may include a feedback data reporting scheme or precoding information. That is, the measurement request message can indicate the feedback data reporting scheme such as the best-M CQI scheme, the best-M average CQI scheme, the best-M CQI supplementary scheme, etc. In addition, the measurement request message can indicate precoding information. That is, for example, the measurement request message can indicate a first codebook set for a best band or a second codebook set for a non-selected band.

The first codebook set is a group of defined codebooks. The first codebook can be configured using various schemes such as a discrete Fourier transform (DFT), householder, Grassmanian, etc., in a codebook-based precoding. In the DFT scheme, an N×N DFT matrix is configured and an input signal is multiplied by the DFT matrix to generate a DFT signal. In the householder scheme, a householder matrix is configured such that a vector on a three-dimensional space is projected on one plane and a Hermitian matrix is found according to QR decomposition of the household matrix. In the Grassmanian scheme, a channel set and a codebook are configured with a k-dimensional subspace included in an n-dimensional channel space by using a subspace packing method. A codebook of the first codebook set may be a codebook known between the BS and the UE.

The second codebook set can be selected from the first codebook set in the configuration process of the second codebook set. If the first codebook set is $C_A = [C_1, C_2, \ldots, C_n]$, the second codebook set can be selected with a specific interval from codebooks included in the first codebook set in the configuration process of the second codebook set. For example, when the first codebook set includes 64 codebooks (n=64), if the second codebook set is configured by a codebook selected with an interval of 4 from the first codebook set, the second codebook set can be configured as $C_B = [C_1, C_5, \ldots, C_{61}]$ and thus can include 16 codebooks.

The BS can indicate the second codebook set through higher-layer signaling so that the UE can know the second codebook set. Since the first codebook set is known both to the BS and the UE, if the BS indicates the first codebook or an interval of a codebook selected from the first codebook set, the UE can know codebooks included in the second codebook set. The UE can assign a logical number according to an order of the codebooks included in the second codebook set and thus can report to the BS a logical number of a codebook selected by the UE.

Upon receiving the measurement result message, the UE measures a channel condition and generates feedback data (step S120). The UE measures a CQI according to a scheme indicated by the measurement request message, and selects a best band in a descending order of the CQI. It is assumed herein that the UE transmits a CQI/PMI of a non-selected band together with a CQI/PMI of the best band according to the best-M CQI supplementary scheme. The UE selects a codebook suitable for the best band from the first codebook set. Further, the UE selects a codebook suitable for the non-selected band from the second codebook set which is partially selected from the first codebook set according to the indication of the BS.

Instead of indicating the second codebook set by the BS, codebooks of the second codebook set can be selected according to a codebook for the best band which is selected by the UE through channel measurement. If the first codebook set includes N codebooks and a codebook selected for the best band among the N codebooks is Ws, K codebooks having a greatest distance from the codebook Ws can be selected as a codebook of the second codebook set from the codebooks of the first codebook set (where N and K are integers satisfying N>K and N,K>0). Equation 1 shows a method for configuring the second codebook set according to a codebook selected for the best band from the first codebook set.

MathFigure 1

$$\text{Min det}(W_s^H W_p), p=0, 1, \ldots, 2^N-1 \quad [\text{Math.1}]$$

Herein, det(.) denotes a determinant, and $(.)^H$ denotes a Hermitian matrix.

Codebooks of the second codebook set configured according to the codebook selected from the first codebook set are renumbered. For example, it is assumed that the first codebook set consists of 16 codebooks $W_0$ to $W_{15}$, and the second codebook set is configured by 4 codebooks $W_1$, $W_2$, $W_3$, and $W_4$ where $W_0$ is selected as a reference codebook from the first codebook set. The codebooks of the second codebook set can be numbered as shown in Table 1.

Table 1 shows an example of renumbering the codebooks of the second codebook set.

TABLE 1

| reference | second codebook | | | |
|---|---|---|---|---|
| codebook | 00 | 01 | 10 | 11 |
| $W_0$Ð $W_8$Ð | $W_1$Ð $W_0$Ð | $W_2$Ð $W_4$Ð | $W_3$Ð $W_{10}$Ð | $W_4$Ð $W_{15}$Ð |

The UE selects a codebook suitable for a non-selected band from the second codebook set, and transmits the renumbering result to the BS. Thus, the UE can report a codebook selected by the UE from the second codebook set.

When the UE selects the codebooks of the second codebook set according to the codebook for the best band selected through channel measurement, the codebook for the best band can be included in the configuration process of the second codebook set. The second codebook set can be configured such that (K−1) codebooks are selected by using the codebook for the best band as a reference codebook and then the reference codebook is added to the second codebook set. Alternatively, the second codebook set can be configured such that K codebooks are selected by using the codebook for the best band as the reference codebook and then one codebook closest in distance to the reference codebook is excluded from the second codebook set whereas the reference codebook is added to the second codebook set. In this case, the codebooks of the second codebook set are also renumbered.

Table 2 shows another example of renumbering the codebooks of the second codebook set.

TABLE 2

| reference | second codebook | | | |
|---|---|---|---|---|
| codebook | 00 | 01 | 10 | 11 |
| $W_0$Ð $W_8$Ð | $W_0$Ð $W_8$Ð | $W_2$Ð $W_4$Ð | $W_3$Ð $W_{10}$Ð | $W_4$Ð $W_{15}$Ð |

In the second codebook set, reference codebooks may be renumbered in the same manner as other codebooks, or the reference codebooks may be numbered to specific numbers.

The UE selects a codebook suitable for the best band from the first codebook set, and obtains a CQI of the best band by using a PMI of the selected codebook. The UE selects a codebook suitable for the non-selected band from the second codebook set, and obtains a CQI of the non-selected band by using a PMI of the selected codebook. The UE generates feedback data by adding a CQI/PMI of the best band and the non-selected band to the feedback data.

The UE transmits the feedback data through an uplink control channel (step S130). The feedback data may include an indicator of the best band selected by the UE, a CQI/PMI of the best band, a CQI/PMI of a non-selected band, second codebook set information, etc.

The BS performs radio resource scheduling according to information included in the feedback data received from the UE (step S140), and transmits scheduling information to the UE (step S150).

As such, in a process of transmitting a CQI and a PMI by the UE to the BS, a predetermined first codebook set is used for the best band, and a second codebook set consisting of some codebooks of the first codebook set is used for a non-selected band, thereby reducing an overhead caused by control signaling.

Table 3 shows basic parameters used for experiments of the proposed method.

TABLE 3

| Parameter | Assumption |
|---|---|
| OFDM parameter | 5 MHz/10 MHz |
| Subframe length | 1.0 ms |
| Frequency granularity for CQI feedback | 2RBs for Best-M |
| CQI Feedback Compression Scheme | Best M average (M = 3) |
| Frequency granularity for PMI feedback | 2RBs for Best-M |
| Channel Models | 6-ray TU |
| Mobile Speed (km/h) | 3 km/h |
| Modulation schemes and channel coding rates | QPSK (R = 1/3, 1/2, 3/4), 16QAM (R = 1/2, 5/8, 3/4), 64QAM (R = 3/5, 2/3, 3/4, 5/6) |
| Channel Code | Turbo code Component decoder: max-log-MAP |

TABLE 3-continued

| Parameter | Assumption |
| --- | --- |
| Codebook scheme | Working assumption [2] |
| Antenna configuration | 4 transmitter, 2 receiver => [4Tx, 2Rx] |
| Channel Estimation | Perfect channel estimation |

Table 4 shows system parameters used for experiments of the proposed method

TABLE 4

| Parameter | Assumption |
| --- | --- |
| Cellular Layout | Hexagonal grid, 19 cell sites, 3 sectors per site |
| Distance-dependent path loss | L = 128.1 + 37.6 log10(.R), R in kilometers |
| Inter site distance | 500 m |
| Penetration loss | 20 dB for 3 km/h users |
| Shadowing standard deviation | 8 dB |
| Shadowing correlation — Between cells | 0.5 |
| Shadowing correlation — Between sectors | 1.0 |
| Antenna pattern (horizontal) (For 3-sector cell sites with fixed antenna patterns) | $A(\theta) = -\min\left[12\left(\frac{\theta}{\theta_{3dB}}\right)^2, A_m\right]$ $\theta_{3dB} = 70$ degrees, $A_m = 20$ dB |
| Total Node-B TX power | 43 dBm (5 MHz), 46 dBm (10 MHz) |
| Minimum distance between UE and cell | 35 meters |
| AMC | ON (2/3 < MCS < 5) |
| Target block error rate | 10% |
| H-ARQ | Chase combining with maximum re-transmission 4 |
| OFDM symbols (Data symbols) per subframe | 14 (10) |
| Scheduling Criterion | Proportional Fair |
| Scheduling | Same MCS used for one codeword across RBs |
| Users per sector | 3, 10 |
| Link Mapping | EESM |
| Other Cell interference | All Node-B transmitters always on at full power |
| CQI feedback delay | 3 TTI (3 ms) |
| Channel Scenario | Macro Cell |

300 subcarriers are included in a 5 MHz bandwidth. Thus, if 12 subcarriers are grouped to constitute one radio block, a whole frequency band consists of 25 resource blocks. To reduce an overhead caused by CQI transmission, two resource blocks are grouped to constitute one subband for CQI transmission, and the CQI is fed back by selecting three subbands as a best band. This information is in regard to 6 resource blocks corresponding to approximately 1/4 resource blocks among 25 resource blocks of the whole frequency band. If four users exist in one cell, there is a high probability that only the best band is scheduled. If three users exist in one cell, the non-selected band is also scheduled, and an effect of a codebook used for the non-selected band can be experimentally examined.

Table 5 shows a result of experiments for examining the effect of the codebook used for the non-selected band.

TABLE 5

| Codebook for Non-Selected Band | Spectral Efficiency (bps/Hz) 3 UE |
| --- | --- |
| 4 bit | 1.50 (98.6%) |
| 3 bit | 1.52 (100%) |

It can be seen that, when three users exist, a case of using a 3-bit codebook for the non-selected band shows a spectral efficiency higher about 1.4% than a case of using a 4-bit codebook for the non-selected band.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting precoding information in a multiple antenna system, the method comprising:
   receiving codebook set information;
   selecting M subbands from a plurality of subbands constituting a whole frequency band in a descending order of a channel quality indicator (CQI), wherein M is an integer greater than 0; and
   transmitting a first precoding matrix indicator (PMI) for the selected M subbands and a second PMI for remaining subbands of the plurality of subbands,
   wherein the first PMI is a PMI of a codebook selected from a first codebook set comprising a plurality of predefined codebooks,
   wherein the second PMI is a PMI of a codebook selected from a second codebook set comprising a part of the plurality of predefined codebooks,
   wherein the part of the plurality of predefined codebooks is indicated by the received codebook set information, and
   wherein the PMI of the codebook selected from the second codebook set is a logical number assigned according to an order of codebooks of the second codebook set.

2. The method of claim 1, wherein the part of the plurality of predefined codebooks comprises a codebook selected from the first codebook set.

3. The method of claim 1, wherein the part of the plurality of predefined codebooks comprises codebooks of the plurality of predefined codebooks of a specific interval.

4. The method of claim 1, wherein a number of codebooks of the second codebook set is less than a number of codebooks of the first codebook set.

5. A method of transmitting control information in a multiple antenna system, the method comprising:
   transmitting codebook set information; and
   receiving a first precoding matrix indicator (PMI) for M subbands of a whole frequency band and a second PMI for remaining subbands of the whole frequency band, wherein M is an integer greater than 0,
   wherein the M subbands are selected from a plurality of subbands constituting the whole frequency band in a descending order of a channel quality indicator (CQI),
   wherein the first PMI is a PMI of a codebook selected from a first codebook set comprising a plurality of predefined codebooks,
   wherein the second PMI is a PMI of a codebook selected from a second codebook set comprising a part of the plurality of predefined codebooks, wherein the part of the plurality of predefined codebooks is indicated by the transmitted codebook set information, and wherein the PMI of the codebook selected from the second codebook set is a logical number assigned according to an order of codebooks of the second codebook set.

6. The method of claim 5, wherein the part of the plurality of predefined codebooks comprises codebooks of the plurality of predefined codebooks of a specific interval.

7. The method of claim 5, wherein a number of codebooks of the second codebook set is less than a number of codebooks of the first codebook set.

8. The method of claim 5, wherein the part of the plurality of predefined codebooks comprises a codebook selected from the first codebook set.

* * * * *